(12) United States Patent
Tiruveedhula et al.

(10) Patent No.: US 9,344,359 B1
(45) Date of Patent: May 17, 2016

(54) INGRESS PROTECTION FOR MULTIPOINT LABEL SWITCHED PATHS

(71) Applicant: Juniper Networks, Inc., Sunnyvale, CA (US)

(72) Inventors: Maruthi Kishore Tiruveedhula, Nashua, NH (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 304 days.

(21) Appl. No.: 14/023,036

(22) Filed: Sep. 10, 2013

(51) Int. Cl.
*H04L 12/707* (2013.01)
*H04L 12/713* (2013.01)
*H04L 12/781* (2013.01)
*H04L 12/761* (2013.01)
*H04L 12/723* (2013.01)
*H04L 12/703* (2013.01)

(52) U.S. Cl.
CPC .............. *H04L 45/50* (2013.01); *H04L 45/16* (2013.01); *H04L 45/28* (2013.01)

(58) Field of Classification Search
None
See application file for complete search history.

(56) References Cited

U.S. PATENT DOCUMENTS

| | | | | |
|---|---|---|---|---|
| 7,269,132 B1* | 9/2007 | Casey | ................. | H04L 41/0663 370/219 |
| 7,626,925 B1* | 12/2009 | Sivabalan | ................. | H04J 3/14 370/228 |
| 2003/0200463 A1* | 10/2003 | McCabe | ............. | H04L 63/0218 726/11 |
| 2005/0111351 A1* | 5/2005 | Shen | ........................ | H04L 45/02 370/217 |
| 2005/0175341 A1* | 8/2005 | Ovadia | .................... | H04L 29/06 398/43 |
| 2006/0140136 A1* | 6/2006 | Filsfils | .................... | H04L 45/02 370/255 |
| 2006/0153067 A1* | 7/2006 | Vasseur | ............... | H04L 12/5695 370/217 |
| 2007/0091793 A1* | 4/2007 | Filsfils | ................. | H04L 12/4633 370/228 |
| 2009/0185478 A1* | 7/2009 | Zhang | ................. | H04L 12/5695 370/216 |
| 2009/0219806 A1* | 9/2009 | Chen | ....................... | H04L 45/00 370/219 |
| 2010/0246388 A1* | 9/2010 | Gupta | ................. | H04L 12/4625 370/225 |
| 2012/0147737 A1* | 6/2012 | Taylor | ................. | H04L 41/0663 370/219 |
| 2013/0208582 A1* | 8/2013 | Wijnands | ............... | H04L 49/552 370/218 |
| 2014/0064062 A1* | 3/2014 | Taillon | .................... | H04L 45/22 370/225 |
| 2015/0009806 A1* | 1/2015 | Bashandy | ........... | H04L 41/0654 370/221 |

OTHER PUBLICATIONS

Callon, R. "Use of OSI IS-IS for Routing in TCP/IP and Dual Environments", Network Working Group, RFC 1195, Dec. 1990, 84 pgs.
Karan et al. "Multicast only Fast Re-Route" draft-karan-mofrr-02, Network Working Group, Internet-Draft, Mar. 9, 2012, 30 pgs.

(Continued)

*Primary Examiner* — Ayaz Sheikh
*Assistant Examiner* — Tarell Hampton
(74) *Attorney, Agent, or Firm* — Shumaker & Sieffert, P.A.

(57) ABSTRACT

Techniques include providing ingress protection for multipoint label switched paths (LSPs). According to the techniques, a primary ingress node and a backup ingress node of a network are both configured to advertise a virtual node identifier of a virtual node as a next hop for a multicast source. Two or more egress nodes of the network then use the virtual node as a root node reachable through the primary ingress node to establish a multipoint LSP. After the multipoint LSP is established, the primary ingress node forwards traffic of the multicast source on the multipoint LSP. When failure occurs at the primary ingress node, the backup ingress node forwards the traffic of the multicast source along a backup path and onto the same multipoint LSP with the virtual node as the root node reachable through the backup ingress node. The techniques enable ingress protection without tearing down the multipoint LSP.

29 Claims, 5 Drawing Sheets

(56) References Cited

OTHER PUBLICATIONS

Minei et al. "Label Distribution Protocol Extensions for Point-to-Multipoint and Multipoint-to-Multipoint Label Switched Paths" draft-ietf-mpls-Idp-p2mp-15, Network Working Group, Internet-Draft, Aug. 4, 2011, 40 pgs.

Moy, J. "OSPF Version 2", Network Working Group, RFC 2328, Apr. 1998, 215 pgs.

U.S. Appl. No. 13/194,571, filed Jul. 29, 2011 entitled "Packet Forwarding Path Programming Using a High-Level Description Language".

* cited by examiner

INGRESS PROTECTION FOR MULTIPOINT LABEL SWITCHED PATHS

TECHNICAL FIELD

The disclosure relates to computer networks and, more particularly, to forwarding network traffic within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as Interior Gateway Protocol (IGP) within an autonomous system (AS) or Border Gateway Protocol (BGP) between ASs.

Multi-Protocol Label Switching (MPLS) is a suite of protocols used to engineer traffic patterns within Internet Protocol (IP) networks. By utilizing MPLS, an ingress or root node can request a path through a network to an egress or leaf node, i.e., a Label Switched Path (LSP). An LSP defines a distinct path through the network to carry MPLS packets from a source connected to the ingress node to a receiver connected to the egress node. Each router along a LSP allocates a label and propagates the label to the closest upstream router along the path. Routers along the path cooperatively perform MPLS operations to forward the MPLS packets along the established path. A variety of protocols exist for establishing LSPs, e.g., Label Distribution Protocol (LDP) and the Resource Reservation Protocol with Traffic Engineering extensions (RSVP-TE).

Some implementations make use of multipoint LSPs, e.g., Point-to-Multipoint (P2MP) LSPs or Multipoint-to-Multipoint (MP2MP) LSPs, in which a path is established through a network from one or more ingress nodes to two or more egress nodes. Multipoint LSPs are commonly used, for example, to distribute multicast traffic. Multipoint extensions of protocols exist for establishing multipoint LSPs, e.g., multipoint extensions of LDP (mLDP). In mLDP, a multipoint LSP may be established according to an egress-initiated signaling model in which each of the egress nodes initiate label information for the multipoint LSP that is propagated upstream through one or more intermediate transit routers along a path toward the root node. The label information for the multipoint LSP includes a label of the sending node allocated for the multipoint LSP and a forwarding equivalence class (FEC) that uniquely identifies the multipoint LSP based on the root node address and an opaque value.

Upon any failure at the root node, the entire multipoint LSP will be torn down and then reestablished between the egress nodes and a changed root node using a new FEC based on the new root node address. For many multicast applications, such as IP television (IPTV), restoring service to multiple receivers by rebuilding the entire multipoint LSP after any root node failure takes too long to maintain a good user experience.

SUMMARY

In general, the techniques of this disclosure provide ingress protection for multipoint label switched paths (LSPs). The multipoint LSPs may include point-to-multipoint (P2MP) LSPs or multipoint-to-multipoint (MP2MP) LSPs. The techniques of this disclosure are applied to a primary ingress node and a backup ingress node of a network that are both connected to a multicast source. According to the techniques, both the primary and backup ingress nodes are configured to advertise a virtual node identifier, also referred to as a context identifier, of a virtual node as a next hop for the multicast source. Two or more egress nodes of the network that receive the advertisement may then use the virtual node as the root node reachable through the primary ingress node to establish a multipoint LSP between the virtual node and the egress nodes.

After the multipoint LSP is established with the virtual node as the root node, the primary ingress node forwards traffic of the multicast source on the multipoint LSP. According to the techniques, when a failure occurs at the primary ingress node, the backup ingress node begins forwarding the traffic of the multicast source along a backup path and onto the same multipoint LSP with the virtual node as the root node. The backup path may be established between the backup ingress node and a merge point (MP) node included in the multipoint LSP to reach the virtual node through the backup ingress node. In this case, the multipoint LSP may be torn down between the primary ingress node and the MP node. In some examples, the backup path may be established as a portion of the multipoint LSP during local repair in response to the failure at the primary ingress node. In other examples, the backup path may be established as a tunnel prior to any failure at the primary ingress node, e.g., at the same time as the multipoint LSP is established.

The techniques enable the virtual node to remain as the root node of the multipoint LSP regardless of whether the primary ingress node or the backup ingress node is used to reach the virtual node. In this way, the entire multipoint LSP does not need to be torn down and reestablished with a new forwarding equivalence class (FEC) based on a changed root node address for any root node failure. The techniques of this disclosure, therefore, may provide faster service restoration to receivers of the multicast traffic and a better user experience by only rebuilding a portion of the path and using the same multipoint LSP with the same root node to distribute the multicast traffic. Specifically, the techniques may provide sub-seconds convergence time, e.g., 50 milliseconds (ms), for switchover of the multicast traffic.

In one example, this disclosure is directed to a method that includes advertising, with a primary ingress node of a network connected to a multicast source, a virtual node identifier that identifies a virtual node as a next hop for the multicast source through the primary ingress node, and advertising, with a backup ingress node of the network connected to the same multicast source, the same virtual node identifier that identifies the same virtual node as the next hop for the multicast source through the backup ingress node. The method further includes forwarding, with the primary ingress node, traffic of the multicast source on a multipoint LSP established between the virtual node as a root node and two or more egress nodes of the network, and, based on a failure at the primary ingress node, forwarding, with the backup ingress node, the traffic of the multicast source along a backup path onto the same multipoint LSP with the virtual node as the root node.

In another example, this disclosure is directed to a network system including a primary ingress node of a network connected to a multicast source and a backup ingress node of the network connected to the same multicast source. The primary ingress node is configured to advertise a virtual node identifier that identifies a virtual node as a next hop for the multicast source through the primary ingress node, and forward traffic of the multicast source on a multipoint LSP established between the virtual node as a root node and two or more egress nodes of the network. In addition, the backup ingress node is configured to advertise the same virtual node identifier that identifies the same virtual node as the next hop for the multicast source through the backup ingress node, and, based on a failure at the primary ingress node, forward the traffic of the multicast source along a backup path onto the same multipoint LSP with the virtual node as the root node.

In a further example, this disclosure is directed to a computer-readable storage medium comprising program instructions for causing one or more programmable processors to advertise, with a primary ingress node of a network connected to a multicast source, a virtual node identifier that identifies a virtual node as a next hop for the multicast source through the primary ingress node, advertise, with a backup ingress node of the network connected to the same multicast source, the same virtual node identifier that identifies the same virtual node as the next hop for the multicast source through the backup ingress node, forward, with the primary ingress node, traffic of the multicast source on a multipoint LSP established between the virtual node as a root node and two or more egress nodes of the network, and based on a failure at the primary ingress node, forward, with the backup ingress node, the traffic of the multicast source along a backup path onto the same multipoint LSP with the virtual node as the root node.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
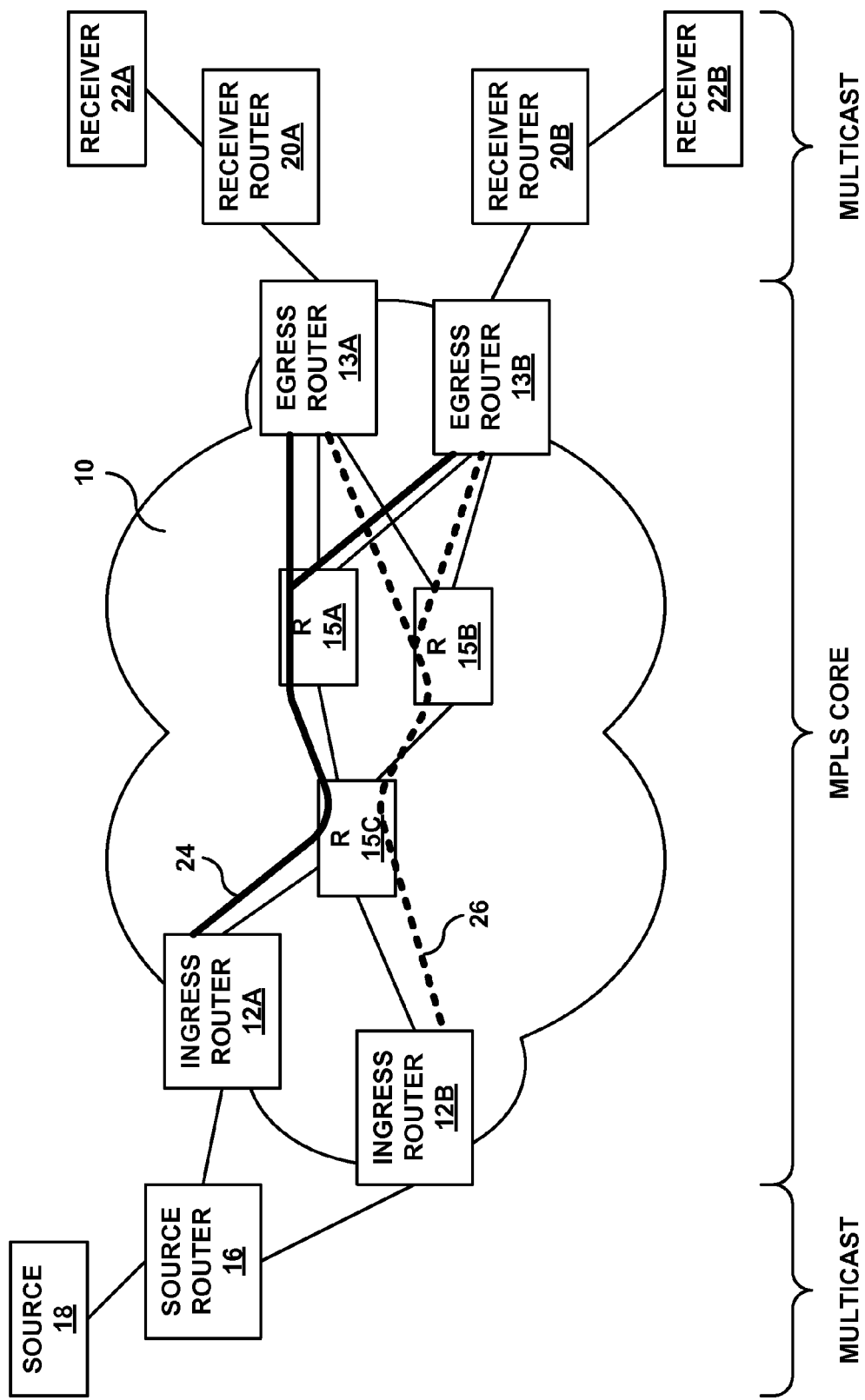
FIG. 1 is a block diagram illustrating an example of a network including multipoint LSPs each established between an ingress router and two or more egress routers to provide multicast service.

FIG. 1 is a block diagram illustrating an example of a network 10 including multipoint LSPs 24, 26 each established between an ingress router and two or more egress routers to provide multicast service. The multipoint LSPs may include point-to-multipoint (P2MP) LSPs or multipoint-to-multipoint (MP2MP) LSPs. In the illustrated example, a primary multipoint LSP 24 is a P2MP LSP established between ingress router 12A as a root node connected to a source 18 and egress nodes 13A and 13B as leaf nodes. In some cases, upon a failure of ingress router 12A, the multicast service may be transferred to a backup multipoint LSP 26 established between an ingress router 12B as a root node also connected to source 18 and egress nodes 13A and 13B.

Network 10 may comprise an Internet Protocol (IP) network, such as the Internet or another public network. As illustrated, network 10 includes ingress routers 12A and 12B ("ingress routers 12"), egress routers 13A and 13B ("egress routers 13"), and intermediate or transit routers (R) 15A-15C ("routers 15"). Network 10 utilizes Multi-Protocol Label Switching (MPLS), which is a suite of protocols used to engineer traffic patterns within IP networks, to operate as an MPLS core IP network. By utilizing MPLS, ingress routers 12 can request paths through network 10 to egress routers 13. In the example illustrated in FIG. 1, primary multipoint LSP 24 and backup multipoint LSP 26 each define a distinct path through network 10 to carry MPLS packets from a remotely located source 18 connected to ingress routers 12 to remotely located receivers 22A and 22B ("receivers 22") connected to egress routers 13.

In the illustrated example, a source 18 is connected to ingress router 12A and ingress router 12B via a source router 16, e.g., a dynamic source router (DSR). Furthermore, receiver 22A is connected to egress router 13A via a receiver router 20A, and receiver 22B is connected to egress router 13B via a receiver router 20B. As shown in FIG. 1, source 18 and receivers 22 are included in IP multicast networks that are located outside of the MPLS core IP network 10. In some examples, source router 16 and source 18 may be included in any public or private network or the Internet to provide multicast traffic to ingress routers 12A and 12B of network 10. In addition, receiver router 20A and receiver 22A may be included in one subscriber or customer network site, and receiver router 20B and receiver 22B may be included in another subscriber or customer network site.

The network sites may be local area networks (LANs) or wide area networks (WANs) that include a plurality of source devices and a plurality of receivers or subscriber devices. In some cases, the network sites may be configured to support multicast traffic, such as Internet Protocol Television (IPTV), desktop conferences, corporate broadcasts, music and video web casts, and other forms of multimedia content. For example, source 18 may comprise a source server of multicast traffic, and receivers 22 may comprise subscriber devices of the multicast traffic. Receivers 22 may include personal computers, laptops, workstations, personal digital assistants (PDAs), wireless devices, network-ready appliances, file servers, print servers or other devices capable of accessing network 10.

Ingress routers 12, egress routers 13 and intermediate routers 15 in network 10 each maintain routing information that describes available routes through network 10. Upon receiving an incoming packet, each of the routers examines information within the packet and forwards the packet in accordance with the routing information. In order to maintain an accurate representation of network 10, the routers exchange intra-network routing information using advertisements in a defined routing protocol, such as an Interior Gateway Protocol (IGP). For example, each of routers 12, 13 and 15 may use a link-state routing protocol, such as the Open Shortest Path First (OSPF) protocol or the Intermediate-System to Intermediate System (IS-IS) protocol, to advertise link-state routing information and learn the topology of network 10. Further details regarding OSPF are found in Moy, J., "OSPF Version 2," RFC 2328, April 1998, the entire content of which is incorporated by reference herein. Further details regarding IS-IS are found in Callon, R., "Use of OSI IS-IS for Routing in TCP/IP and Dual Environments," RFC 1195, December 1990, the entire content of which is incorporated by reference herein.

In addition, ingress routers 12 and egress routers 13 each maintain routing information that describes available routes between network 10 and other remote networks. For example, ingress routers 12 and egress routers 13 may use border gateway protocol (BGP) to exchange inter-network routing information with edge routers, i.e., ingress and egress routers, of network 10 and other remote networks. Ingress routers 12 and egress routers 13 exchange routing information using advertisements in BGP to discover BGP peers or next hops of network 10. In addition, ingress routers 12 and egress routers 13 exchange routing information using advertisements according to BGP with source router 16 and receiver routers 20 to discover BGP peers or next hops of subscriber or customer network sites. In this way, egress routers 13 may determine a root node address for primary multipoint LSP 24 and/or backup multipoint LSP 26 based on the discovered BGP next hop of source 18.

In the example of primary multipoint LSP 24, ingress router 12A requests a multipoint path through network 10 to carry multicast traffic of source 18 to egress routers 13. Ingress routers 12, egress routers 13, and transit routers 15 may use multipoint extensions of the label distribution protocol (mLDP) to establish primary multipoint LSP 24. In mLDP, primary multipoint LSP 24 is established according to an egress-initiated signaling model in which each of egress routers 13 initiates label information for primary multipoint LSP 24 that is propagated upstream along the shortest upstream path toward ingress router 12A. Egress routers 13 and intermediate transit routers 15 along the path each allocates its own label and propagates the label information for primary multipoint LSP 24 to the upstream router along the path. Upon receiving the label information, intermediate routers 15 and ingress routers 12 each programs its packet forwarding engine (PFE) to include the downstream-allocated label as a next hop to forward packets on primary multipoint LSP 24 to egress routers 13.

The label information for primary multipoint LSP 24 includes the allocated label and a multipoint forwarding equivalence class (FEC) that uniquely identifies primary multipoint LSP 24 based on the root node address and an opaque value. The multipoint FEC includes a tree type of the path, e.g., P2MP, MP2MP upstream or MP2MP downstream, an address family of the root node address, i.e., IPv4 or IPv6, the root node address and the opaque value. The root node address used in the FEC for primary multipoint LSP 24 may be determined as a loopback address of ingress router 12A or may be automatically determined from the BGP-advertised next hop of source 18. In some examples, the opaque value used in the FEC for primary multipoint LSP 24 may represent the (source, group) multicast stream of source 18 for protocol independent multicast (PIM) with in-band signaling. In other examples, the opaque value used in the FEC for primary multipoint LSP 24 may represent an LSP identifier for BGP with out-of-band-signaling. More information about mLDP may be found in Minei, I., "Label Distribution Protocol Extensions for Point-to-Multipoint and Multipoint-to-Multipoint Label Switched Paths," draft-ietf-mpls-ldp-p2mp-15, Aug. 4, 2011, the entire contents of which are incorporated by reference herein.

Once primary multipoint LSP 24 is established between ingress router 12A and egress routers 13, receivers 22 may request to receive multicast traffic of source 18 over primary multipoint LSP 24. For example, receiver routers 20 may send protocol independent multicast (PIM) join messages to egress routers 13, which then propagate the join message to ingress router 12A and to source router 16. The PIM join messages may identify a specific multicast group for which source 18 provides multicast traffic using either a source specific (source, group) key or a generic source (*, group) key. Upon receiving the join messages, source router 16 will route the multicast traffic of source 18 to ingress router 12A and onto primary multipoint LSP 24 for delivery to interested receivers 22.

Conventionally, upon any failure at the root node, i.e., ingress router 12A, the entire multipoint LSP 24 will be torn down. The failure at ingress router 12A may be a failure of ingress router 12A or a failure of the connection between source 18 and ingress router 12A. Once the failure is detected by egress nodes 13A and 13B, a backup multipoint LSP 26 is established between ingress router 12B as a new root node and egress nodes 13A and 13B. The reestablished LSP will have a new FEC that includes the new root node address to uniquely identify backup multipoint LSP 26. For many multicast applications, such as IP television (IPTV), restoring multicast service by rebuilding the entire multipoint LSP after any root node failure takes too long to maintain a good user experience.

Figure 2:
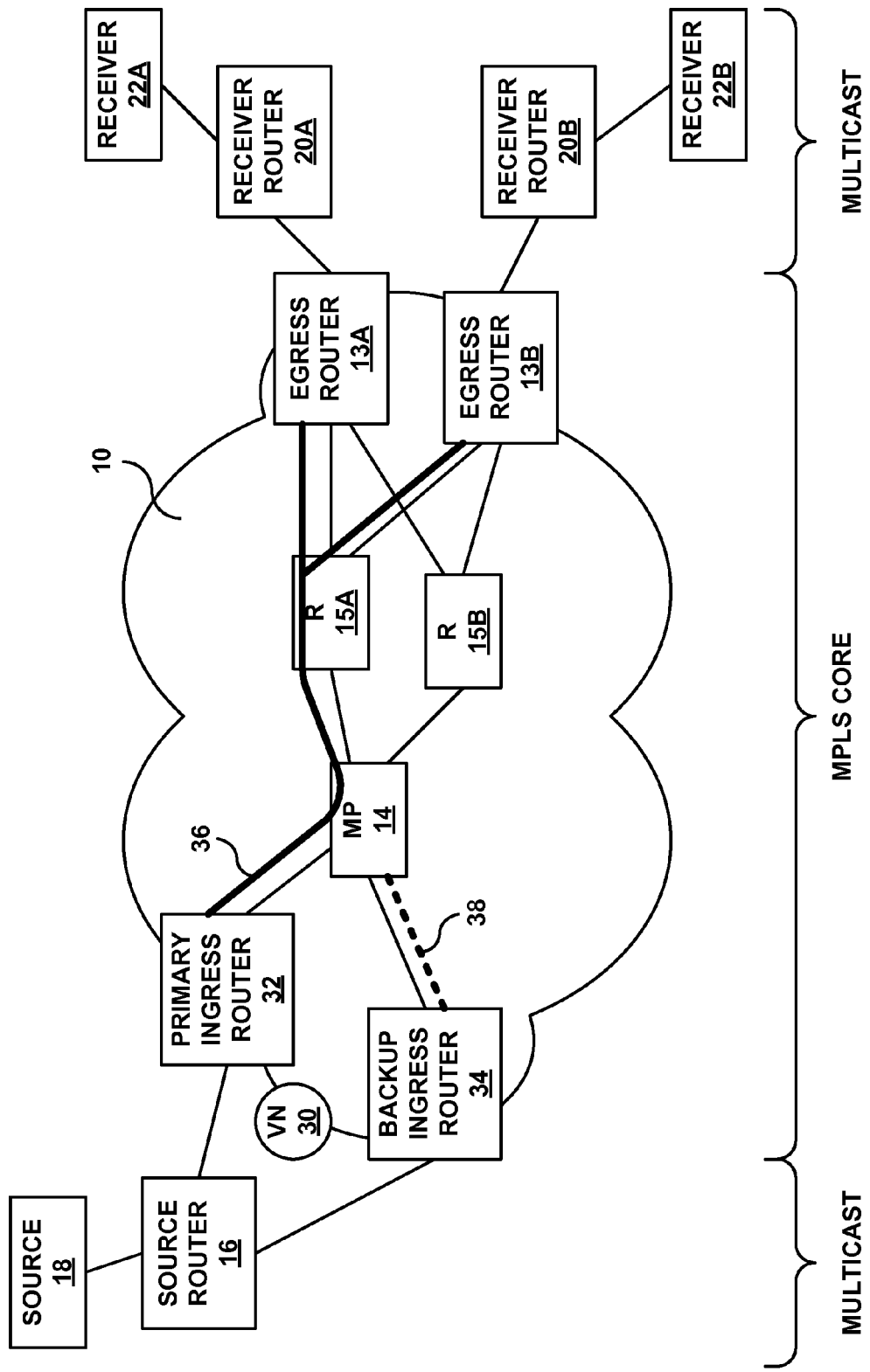
FIG. 2 is a block diagram illustrating another example of the network including a primary ingress router and a backup ingress router configured to provide ingress protection for a multipoint LSP rooted at a virtual node reachable through both of the ingress routers.

In some examples, backup multipoint LSP 26 may be established at the same time as primary multipoint LSP 24 in order to provide multicast only fast re-route (MoFRR). In this way, once a failure at ingress router 12A is detected by egress nodes 13A and 13B, the multicast service is transferred to the pre-established backup multipoint LSP 26. The MoFRR, however, requires two streams of multicast traffic to be flowing through network 10, i.e., on both primary and backup multipoint LSPs 24 and 26, which consumes more network bandwidth for the same multicast service. In addition, the MoFRR requires primary and backup multipoint LSPs 24 and 26 to have disjointed paths. Furthermore, in this case, the failure at ingress router 12A as the root node of primary multipoint LSP 14 is detected by egress routers 13A and 13B using the interior gateway protocol (IGP), which may take too long to detect the failure and transfer the multicast service to backup multipoint LSP 26. Additional information regarding MoFRR is found in Karan, A., "Multicast only Fast Re-Route," draft-karan-mofrr-02, IETF Network Working Group, Internet-Draft, March 2012, the entire content of which is incorporated by reference herein The techniques of this disclosure, described in more detail below with respect to FIG. 2, provide ingress protection for multipoint LSPs in order to avoid tearing down an entire multipoint LSP upon a failure at an ingress router. The techniques provide faster service restoration of the multicast service and a better user experience by only rebuilding a portion of the path and using the same multipoint LSP with the same root node to distribute the multicast traffic. Specifically, the techniques provide sub-seconds convergence time, e.g., 50 milliseconds (ms), for switchover of the multicast traffic.

FIG. 2 is a block diagram illustrating another example of network 10 including a primary ingress router 32 and a backup ingress router 34 configured to provide ingress protection for a multipoint LSP 36 rooted at a virtual node (VN) 30 reachable through either of ingress routers 32, 34. The multipoint LSP may include a P2MP LSP or a MP2MP LSP. In the illustrated example, multipoint LSP 36 is a P2MP LSP established between VN 30 as a root node reachable through primary ingress router 32 connected to a source 18 and egress routers 13A and 13B as leaf nodes. According to the techniques of this disclosure, upon a failure at primary ingress router 32, the multicast service may be transferred to backup ingress router 34, also connected to source 18, to forward multicast traffic along a backup path 38 and onto the same multipoint LSP 36 with the same VN 30 as the root node reachable through backup ingress router 34.

Network 10 comprises an MPLS core IP network that operates as described above with respect to FIG. 1 to provide multicast service between source 16 and receivers 22 included in remote IP multicast networks located outside of the MPLS core IP network 10. As illustrated in FIG. 2, network 10 includes primary ingress router 32 and backup ingress router 34 configured to provide ingress protection for multipoint LSP 36 according to the techniques of this disclosure. In addition, as shown in FIG. 2, one of intermediate routers 15 has been designated as a merge point (MP) router 14 that is common next hop for primary ingress router 32 and backup ingress router 34. In the example illustrated in FIG. 2, multipoint LSP 36 defines a distinct path through network 10 to carry MPLS packets from remotely located source 18 connected to primary ingress router 32 and backup ingress router 34 to remotely located receivers 22 connected to egress routers 13.

Similar to ingress routers 12 from FIG. 1, primary ingress router 32 and backup ingress router 34 maintain routing information that describes available routes through network 10 and between network 10 and other remote networks. For example, primary and backup ingress routers 32 and 34 may exchange intra-network routing information using advertisements in an IGP, such as the OSPF protocol or the IS-IS protocol, to learn the topology of network 10. In addition, primary and backup ingress routers 32 and 34 may exchange routing information using advertisements in BGP with egress routers 13 and other edge routers of network 10 to discover BGP peers or next hops of network 10. In addition, primary and backup ingress routers 32 and 34 exchange routing information using advertisements according to BGP with source router 16 and receiver routers 20 to discover BGP peers or next hops of subscriber or customer network sites.

According to the techniques, both primary ingress router 32 and backup ingress router 34 advertise a virtual node identifier that identifies VN 30 as the next hop of source 18 using BGP. In this way, egress routers 13 may determine a root node address for multipoint LSP 36 to be the virtual node identifier of VN 30 reachable through primary ingress router 32 based on the discovered BGP next hop of source 18. In addition, both primary ingress router 32 and backup ingress router 34 advertise the same virtual node identifier that identifies VN 30 as a virtual node of network 10 to MP router 14 and the other intermediate routers 15 using the IGP. In this way, MP router 14 and intermediate routers 15 include VN 30 as another node in the topology of network 10. The virtual node identifier of VN 30 may be a globally unique IP address.

Multipoint LSP 36 may be established between VN 30 as the root node reachable through primary ingress router 32 and egress routers 13 using the egress-initiated signaling model of mLDP as described with respect to FIG. 1. In the example of multipoint LSP 36, primary ingress router 32 requests a multipoint path through network 10 to carry multicast traffic of source 18 to egress routers 13. In response, each of egress routers 13 initiates label information for multipoint LSP 36 that is propagated upstream along the shortest upstream path toward VN 30 as the root node reachable through primary ingress router 32. In this case, the label for multipoint LSP 36 includes the downstream-allocated label and a multipoint FEC that includes the virtual node identifier of VN 30 as the root node address.

The techniques of this disclosure are applied to primary ingress router 32 and backup ingress router 34 of network 10 that are both connected to multicast source 18. According to the techniques, both primary and backup ingress routers 32 and 34 are configured to advertise the same virtual node identifier, also referred to as a context identifier, of VN 30 as a next hop for multicast source 18. As described above, ingress routers 32 and 34 may advertise the virtual node identifier of VN 30 using BGP. In addition, primary ingress router 32 may advertise a lower routing metric than backup ingress router 34 to MP router 14 and the other intermediate routers 15 in network 10 using IGP. In this way, MP router 14 will be sure to select primary ingress router 32 as the shortest upstream path toward VN 30. Egress routers 13 of network 10 then use VN 30 as the root node reachable through primary ingress router 32 to establish multipoint LSP 36 between VN 30 and egress routers 13.

Once multipoint LSP 36 is established between VN 30 as the root node reachable through primary ingress router 32 and egress routers 13, receivers 22 may request to receive multicast traffic of source 18 over multipoint LSP 36. For example, receiver routers 20 may send PIM join messages to egress routers 13, which then propagate the join message to primary ingress router 32 and to source router 16. The PIM join messages may identify a specific multicast group for which source 18 provides multicast traffic using either a source specific (source, group) key or a generic source (*, group) key. Upon receiving the join messages, source router 16 will route the multicast traffic of source 18 to primary ingress router 32. Primary ingress router 32 then forwards the multicast traffic of source 18 on multipoint LSP 36.

According to the techniques of this disclosure, when a failure occurs at primary ingress router 32, backup ingress router 34 begins forwarding the traffic of multicast source 18 along a backup path 38 and onto the same multipoint LSP 36 with VN 30 as the root node. In this case, the portion of multipoint LSP 36 between primary ingress router 32 and MP router 14 may be torn down. Backup path 38 may be established between backup ingress router 34 and MP router 14 along multipoint LSP 36 to reach VN 30 through backup ingress router 34. Once backup path 38 is established between backup ingress router 34 and MP router 14, backup ingress router 34 may send a new PIM join message on behalf of receivers 22 to receive multicast traffic of source 18 over multipoint LSP 36 through backup ingress router 32. Upon receiving the new join message, source router 16 will route the multicast traffic of source 18 to backup ingress router 34 and along backup path 38 onto multipoint LSP 36 for delivery to interested receivers 22. In some cases, backup path 38 may be established using the resource reservation protocol (RSVP) or another label distribution protocol that enables traffic engineering.

In one example, backup path 38 may be established by MP router 14 as a portion of multipoint LSP 36 during local repair in response to the failure at primary ingress router 32. For example, upon a failure at primary ingress router 32, MP router 14 detects the failure and builds portion 38 of multipoint LSP 36 to reach VN 30 as the root node via an alternate path through backup ingress router 34. In another example, backup path 38 may be established by backup ingress router 34 as a tunnel prior to any failure at primary ingress router 32, e.g., at the same time as multipoint LSP 36 is established. For example, primary ingress router 32 may create a targeted LDP session with backup ingress router 34. In this case, primary ingress router sends label information for multipoint LSP 36 to backup ingress router 34. Based on the label information, backup ingress router 34 establishes tunnel 38. Upon a failure at primary ingress router 32, backup ingress router 32 detects the failure over the targeted LDP session and begins forwarding traffic of multicast source 18 through tunnel 38 onto multipoint LSP 36 with the same VN 30 as the root node.

The techniques enable VN 30 to remain as the root node of multipoint LSP 36 regardless of whether primary ingress router 32 or backup ingress router 34 is used to reach VN 30. In this way, the entire multipoint LSP 36 does not need to be torn down and reestablished with a new FEC based on a changed root node address for any failure at primary ingress routers 32. The techniques of this disclosure, therefore, provide faster service restoration to receivers 22 of the multicast traffic and a better user experience by only rebuilding a portion of the path, i.e., backup path 38, and using the same multipoint LSP 36 with the same root node to distribute the multicast traffic.

Figure 3:
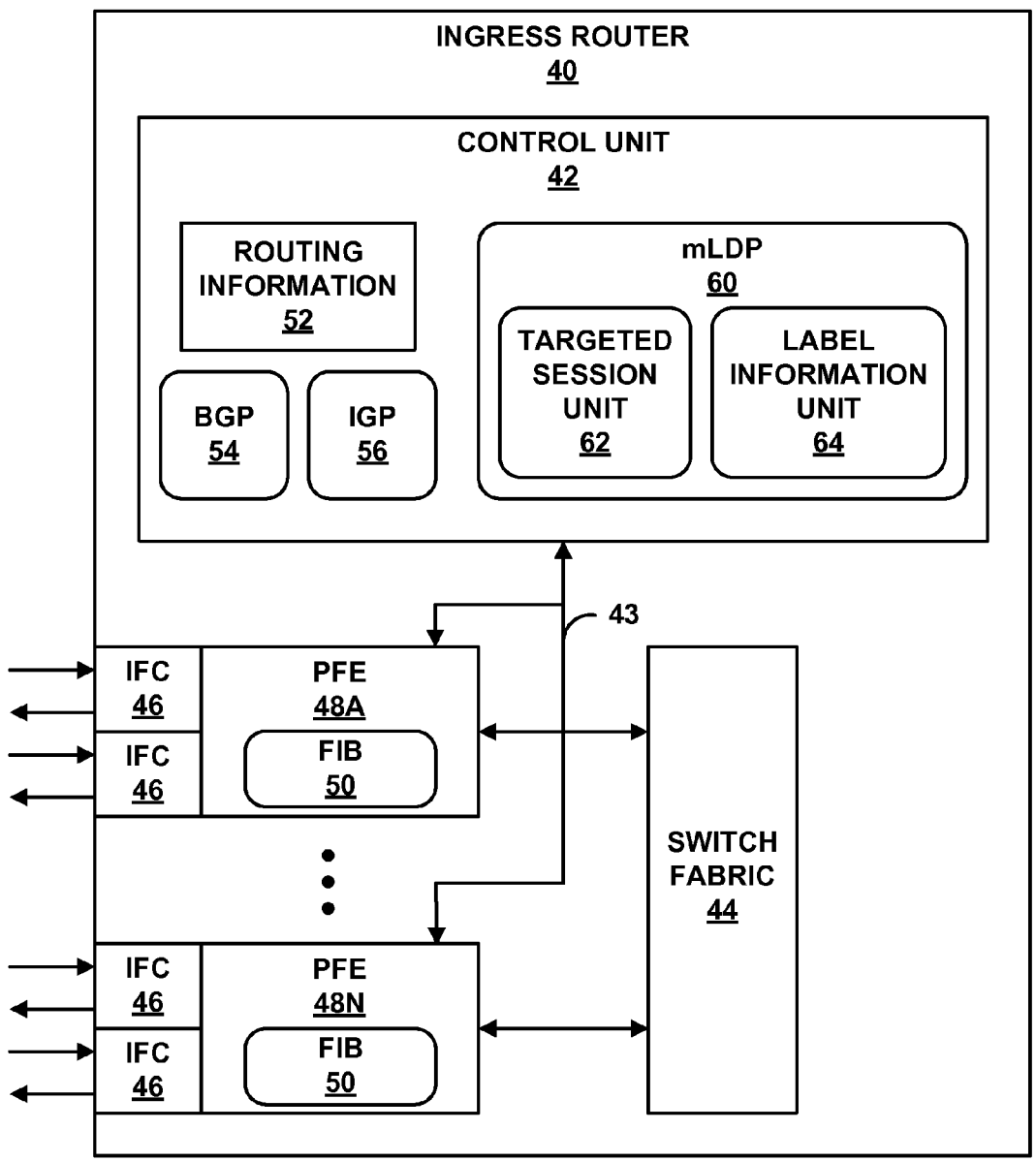
FIG. 3 is a block diagram illustrating an example of an ingress router configured to provide ingress protection for a multipoint LSP rooted at a virtual node reachable through the ingress router.

FIG. 3 is a block diagram illustrating an exemplary ingress router 40 configured to provide ingress protection for a multipoint LSP rooted at a virtual node reachable through ingress router 40. As one example, ingress router 40 may comprise a primary ingress router of a network configured to operate as a physical device on which to execute a virtual root node of a multipoint LSP. In this case, ingress router 40 may operate substantially similar to primary ingress router 32 from FIG. 2. As another example, ingress router 40 may comprise a backup ingress router of a network configured to operate as an alternative physical device on which to execute the virtual root node of the multipoint LSP. In this case, ingress router 40 may operate substantially similar to backup ingress router 34 from FIG. 2.

In the illustrated example, ingress router 40 includes a control unit 42 that provides control plane functionality for the network device. Ingress router 40 also includes switch fabric 44 interconnecting a set of packet-forwarding engines 48A-48N ("PFEs 48") that send and receive traffic by a set of interface cards 46 ("IFCs 46") that typically have one or more physical network interfaces (i.e., ports). PFEs 48 and switch fabric 44 collectively provide a forwarding plane for forwarding transit network traffic. As shown in FIG. 3, each of PFEs 48 includes forwarding information base (FIB) 50 that stores forwarding data structures installed by control unit 42. Although not shown in FIG. 3, PFEs 48 may each comprise a central processing unit (CPU), memory and one or more programmable packet-forwarding application-specific integrated circuits (ASICs). Switch fabric 44 provides a high-speed interconnect for forwarding incoming data packets between PFEs 48 for transmission over a network.

Control unit 42 provides an operating environment for various protocols that perform control plane functions for ingress router 40. As illustrated in FIG. 3, control unit 42 includes BGP 54, IGP 56, and m LDP 60. In some examples, IGP 56 may comprise the OSPF protocol or the IS-IS protocol. Control unit 42 may include one or more daemons (not shown) that comprise user-level processes that run network management software, execute routing protocols to communicate with peer routers, maintain and update one or more routing tables, and create one or more forwarding tables for installation to PFEs 48, among other functions. For example, one of the daemons may use BGP 54 as the control plane protocol for advertising services, e.g., multicast virtual private networks (MVPNs), offered by a service provider network between provider edge routers, e.g., ingress routers and egress routers, in order to transparently interconnect customers connected to the network. As another example one of the daemons, e.g., a routing protocol daemon (RPD), may use IGP 56 as the link state routing protocol to advertise a topology of the network.

Control unit 42 maintains routing information 52 that defines routes to destinations within the network and topology data that represents the overall topology of the network. Routing information 52 may include, for example, route data that describes various routes within the network, and corresponding next hop data indicating appropriate neighboring devices within the network for each of the routes. Ingress router 40 updates routing information 52 based on advertisements received using BGP 54 and IGP 56 to accurately reflect the topology of the network. Based on routing information 52, control unit 42 generates forwarding data structures for FIBs 50 installed within PFEs 48 in the forwarding plane. FIBs 50 associate network destinations with specific next hops and corresponding interface ports within the forwarding plane. Forwarding path programming of FIBs 50 is described in more detail below.

In accordance with the techniques of the disclosure, control unit 42 also provides an operating environment for mLDP 60 to execute. Control unit 42 uses mLDP 60 to establish a multipoint LSP, e.g., a P2MP LSP or MP2MP LSP, that includes ingress router 40 to carry traffic of a multicast source to two or more egress routers. mLDP 60 includes a targeted session unit 62 that establishes and maintains targeted LDP session with other edge routers, i.e., ingress and egress routers. Targeted session unit 62 establishes a targeted LDP session by periodically sending targeted unicast hello messages to another edge router over any link between the routers. In this way, the targeted LDP session may be established between non-directly connected edge routers. In addition, the targeted LDP session may remain active as long as at least one link remains between the routers to exchange the targeted hello messages.

In some examples, mLDP 60 also includes a label information unit 64 that is configured to send label information for the multipoint LSP established through ingress router 40 to a backup ingress router to provide ingress protection for the multipoint LSP. Upon a failure at ingress router 40, the backup ingress router 40 may use the label information to build an alternate path to the multicast source without tearing down the entire multipoint LSP. In some cases, label information unit 64 may send the label information to the backup ingress router over a targeted LDP session. In other cases, label information unit 64 may exchange the label information with the backup ingress router as a BGP peer of ingress router 40.

In one example, ingress router 40 may comprise a primary ingress router of a network connected to a multicast source, which is also connected to a backup ingress router. According to the techniques, in order to provide ingress protection for a multipoint LSP, control unit 42 of primary ingress router 40 uses BGP 54 to advertise a virtual node identifier, also referred to as a context identifier, of a virtual node (VN) as the next hop for the multicast source through primary ingress router 40. The virtual node identifier may comprise a globally unique IP address that is reachable through primary ingress router 40 and the backup ingress router. In addition, control unit 42 may use IGP 56 to advertise the virtual node identifier of the VN to intermediate routers within the network as a virtual ingress node in the topology of the network. In this way, the VN will be viewed as though it were an actual ingress node of the network when updating routing information 52.

The multipoint LSP is initially established with the VN as the root node through primary ingress router 40. For example, primary ingress router 40 and the backup ingress router may both advertise routing metrics appropriate for their roles. In this case, primary ingress router 40 uses IGP 56 to advertise a lower routing metric than the backup ingress router to ensure that the intermediate routers will select primary ingress router 40 as the shortest upstream path toward the VN.

During establishment of the multipoint LSP through primary ingress router 40, control unit 42 receives label information for the multipoint LSP from a downstream intermediate router, for example a merge point (MP) router that is a next hop router for both primary ingress router 40 and the backup ingress router. The label information for the multipoint LSP includes an address of the MP router, the FEC of the multipoint LSP, and a label for the MP router. The FEC uniquely identifies the multipoint LSP, and the MP router address and label provide forwarding information for the multipoint LSP. Control unit 42 then programs forwarding data structures into FIBs 50 of PFEs 48 to include the next hop label for the MP router along the multipoint LSP. Once the multipoint LSP is established, control unit 42 sends a PIM join message to the multicast source to receive traffic of the multicast source. Primary ingress router 40 receives the multicast traffic on one of IFCs 46 and uses FIB 50 of the associated one PFEs 48 to forward the traffic on another of IFCs 46 to the next hop MP router along the multipoint LSP using the next hop label.

In some cases, when a failure occurs at primary ingress router 40, the next hop MP router may detect the failure and establish a backup path as a portion of the multipoint LSP during local repair to reach the VN as the root node through the backup ingress router. The failure at primary ingress router 40 may be a node failure of primary ingress router 40 or a link failure between the multicast source and primary ingress router 40. Based on the failure, control unit 42 may tear down the portion of the multipoint LSP between primary ingress router 40 and the next hop MP router. In this way, the multicast service may be restored quickly, i.e., sub-seconds convergence time, through the backup ingress router using the same multipoint LSP with the same VN as the root node now reachable through the backup ingress router instead of primary ingress router 40.

In other cases, prior to a failure at primary ingress router 40, the backup ingress router may pre-establish a backup path as a tunnel for the multipoint LSP to reach the VN as the root node through the backup ingress router. In this case, targeted session unit 62 of mLDP 60 creates a targeted LDP session between primary ingress router 40 and the backup ingress router. In addition, control unit 42 may run bidirectional forwarding detection (BFD) over the targeted LDP session to enable the backup ingress router to detect any failure at primary ingress router 40.

Label information unit 64 of mLDP 60 then sends the label information for the multipoint LSP to the backup ingress router. Label information unit 64 provides an extension to the operation of mLDP 60. As an example, label information unit 64 may send the label information over the targeted LDP session or between BGP peers. Label information unit 64 sends the label information to the backup ingress router because during establishment of the multipoint LSP the mutual next hop MP router only sends the label information to primary ingress router 40 along the shortest upstream path. The backup ingress router needs the label information to pre-establish the tunnel to provide ingress protection for the multipoint LSP.

In this case, when a failure occurs at primary ingress router 40, the backup ingress router detects the failure based on BFD running over the targeted LDP session and begins forwarding the multicast traffic through the pre-established tunnel and onto the multipoint LSP. Based on the failure, control unit 42 may tear down the multipoint LSP between primary ingress router 40 and the next hop MP router. In this way, the multicast service may be restored quickly, i.e., sub-seconds convergence time, through the backup ingress router using the same multipoint LSP with the same VN as the root node now reachable through the backup ingress router instead of primary ingress router 40.

In another example, ingress router 40 may comprise a backup ingress router of a network connected to a multicast source, which is also connected to a primary ingress router. According to the techniques, in order to provide ingress protection for a multipoint LSP, control unit 42 of backup ingress router 40 uses BGP 54 to advertise a virtual node identifier, also referred to as a context identifier, of a virtual node (VN) as the next hop for the multicast source through backup ingress router 40. The virtual node identifier may comprise a globally unique IP address that is reachable through both the primary ingress router and backup ingress router 40. In addition, control unit 42 may use IGP 56 to advertise the virtual node identifier of the VN to intermediate routers within the network as a virtual ingress node in the topology of the network. In this way, the VN will be viewed as though it were an actual ingress node of the network when updating routing information 52.

The multipoint LSP is initially established with the VN as the root node through the primary ingress router. For example, the primary ingress router and backup ingress router 40 may both advertise routing metrics appropriate for their roles. In this case, backup ingress router 40 uses IGP 56 to advertise a higher routing metric than the primary ingress router to ensure that the intermediate routers will select the primary ingress router as the shortest upstream path toward the VN.

In some cases, when a failure occurs at the primary ingress router, a downstream intermediate router, for example a merge point (MP) router that is a next hop router for both the primary ingress router and backup ingress router 40, may detect the failure and establish a backup path as a portion of the multipoint LSP during local repair to reach the VN as the root node through backup ingress router 40. During establishment of the backup path as the portion of the multipoint LSP, control unit 42 receives label information from the next hop MP router for the portion of the multipoint LSP. The label information for the portion of the multipoint LSP includes an address of the MP router and a label for the MP router. Control unit 42 then programs forwarding data structures into FIBs 50 of PFEs 48 to include the next hop label for the MP router for the portion of the multipoint LSP.

Once the portion of the multipoint LSP is established, control unit 42 sends a PIM join message to the multicast source to receive traffic of the multicast source. Backup ingress router 40 receives the multicast traffic on one of IFCs 46 and uses FIB 50 of the associated one PFEs 48 to forward the traffic on another of IFCs 46 through the local repair tunnel to the next hop MP router along the multipoint LSP. In this way, the multicast service may be restored quickly, i.e., sub-seconds convergence time, through backup ingress router 40 using the same multipoint LSP with the same VN as the root node now reachable through backup ingress router 40 instead of the primary ingress router.

In other cases, prior to a failure at the primary ingress router, backup ingress router 40 may pre-establish a backup path as a tunnel for the multipoint LSP to reach the VN as the root node through backup ingress router 40. In this case, targeted session unit 62 of mLDP 60 creates a targeted LDP session between the primary ingress router and backup ingress router 40. In addition, control unit 42 may run bidirectional forwarding detection (BFD) over the targeted LDP session to enable backup ingress router 40 to detect any failure at the primary ingress router.

Control unit 64 receives label information for the multipoint LSP from the primary ingress router over the targeted LDP session or between BGP peers. The label information for the multipoint LSP includes an address of the MP router, the FEC of the multipoint LSP, and a label for the MP router. During establishment of the multipoint LSP, the MP router only sends the label information for the multipoint LSP to the primary ingress router along the shortest upstream path. Backup ingress router 40 needs the label information from the primary ingress router to pre-establish the tunnel to provide ingress protection for the multipoint LSP.

Control unit 42 may then pre-establish, e.g., at the same time that the multipoint LSP is established, the tunnel between backup ingress router 40 and the next hop MP router based on the label information received from the primary ingress router. In some cases, control unit 42 establishes the tunnel using RSVP or some other routing protocol that enables traffic engineering. Control unit 42 then programs forwarding data structures into FIB 50s of PFEs 48 to include a label stack that includes a top label for the tunnel and a bottom label for the multipoint LSP. Once the tunnel is established, control unit 42 sends a PIM join message to the multicast source to receive traffic of the multicast source. Backup ingress router 40 receives the multicast traffic on one of IFCs 46 and drops the traffic until forwarding control for the multipoint LSP is transferred to backup ingress router 40 upon failure at the primary ingress router.

In this case, when a failure occurs at the primary ingress router, control unit 42 detects the failure based on BFD running over the targeted LDP session and begins forwarding the multicast traffic through the pre-established tunnel and onto the multipoint LSP using the label stack. In this way, the multicast service may be restored quickly, i.e., sub-seconds convergence time, through backup ingress router 40 using the same multipoint LSP with the same VN as the root node now reachable through backup ingress router 40 instead of the primary ingress router.

Control unit 42 of ingress router 40 may include one or more daemons (not shown) that identify individual programs for compilation and instantiation as forwarding data structures in FIBs 50 to perform forwarding plane functionality of ingress router 40. The programs may specify functions to be performed on the packet, including fundamental packet forwarding operations such as input packet processing, route lookup, and output packet processing, as well as service functions such as packet filtering or access control, statistical sampling, traffic policing, rate limiting, and accounting. The daemons select the appropriate forwarding data structures for installation in FIBs 50 of PFEs 48 to establish packet forwarding paths and provide lookup data. Additional information regarding packet forwarding path programming is available in PACKET FORWARDING PATH PROGRAMMING USING A HIGH-LEVEL DESCRIPTION LANGUAGE, U.S. application Ser. No. 13/194,571, filed Jul. 29, 2011, which is incorporated herein by reference in its entirety.

In the example of FIG. 3, control unit 42 is connected to each of PFEs 48 by a dedicated internal communication link 43. For example, dedicated link 43 may comprise a 200 Mbps or Gigabit Ethernet connection for internal communication between the multiple components of ingress router 40. In one embodiment, control unit 42 communicates data representative of FIB 50 into PFEs 48 to program the PFEs 48 and thereby control forwarding of traffic by the corresponding components within the forwarding plane. This allows FIB 50 stored in memory (e.g., on-chip RAM) in each of PFEs 48 to be updated without degrading packet-forwarding performance of ingress router 40. In some instances, control unit 42 may derive a separate and different FIB for each of the respective PFEs 48. In addition, one or more of PFEs 48 may include packet-forwarding ASICs (not shown in FIG. 3) that PFEs 48 program with a hardware-copy FIB based on FIB 50 (i.e., hardware versions of the software FIBs) in each of the respective PFEs 48.

PFEs 48 process packets by performing a series of operations on each packet over respective internal packet forwarding paths as the packets traverse the internal architecture of ingress router 40. Operations may be performed, for example, on each packet by any of a corresponding ingress interface, an ingress one of PFEs 48, an egress one of PFEs 48, an egress interface or other components of ingress router 40 to which the packet is directed prior to egress. PFEs 48 each include forwarding data structures within FIB 50 that, when executed, examine the contents of each packet and on that basis make forwarding decisions, apply filters, and/or perform accounting, management, traffic analysis, and load balancing, for example. The result of packet processing determines the manner in which a packet is forwarded or otherwise processed by PFEs 48 from its ingress interface on one of IFCs 46 to its egress interface on one of IFCs 46.

The architecture of ingress router 40 illustrated in FIG. 3 is shown for exemplary purposes only. The disclosure is not limited to this architecture. In other embodiments, ingress router 40 may be configured in a variety of ways. In one embodiment, for example, some of the functionally of control unit 42 may be distributed within PFEs 48. The operating environment of control unit 42 may be implemented solely in software, or hardware, or may be implemented as a combination of software, hardware or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, control unit 42 may include various software modules or daemons executing on an operating system, and may include executable instructions stored, embodied, embedded, or encoded in a non-transitory computer-readable storage medium, such as computer memory or hard disk. Instructions stored in a computer-readable medium may cause a programmable processor, or other processor, to perform methods described herein, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of ingress router 40, e.g., protocols. Control unit 42, in some examples, retrieves and executes the instructions from memory for these aspects.

Figure 4:
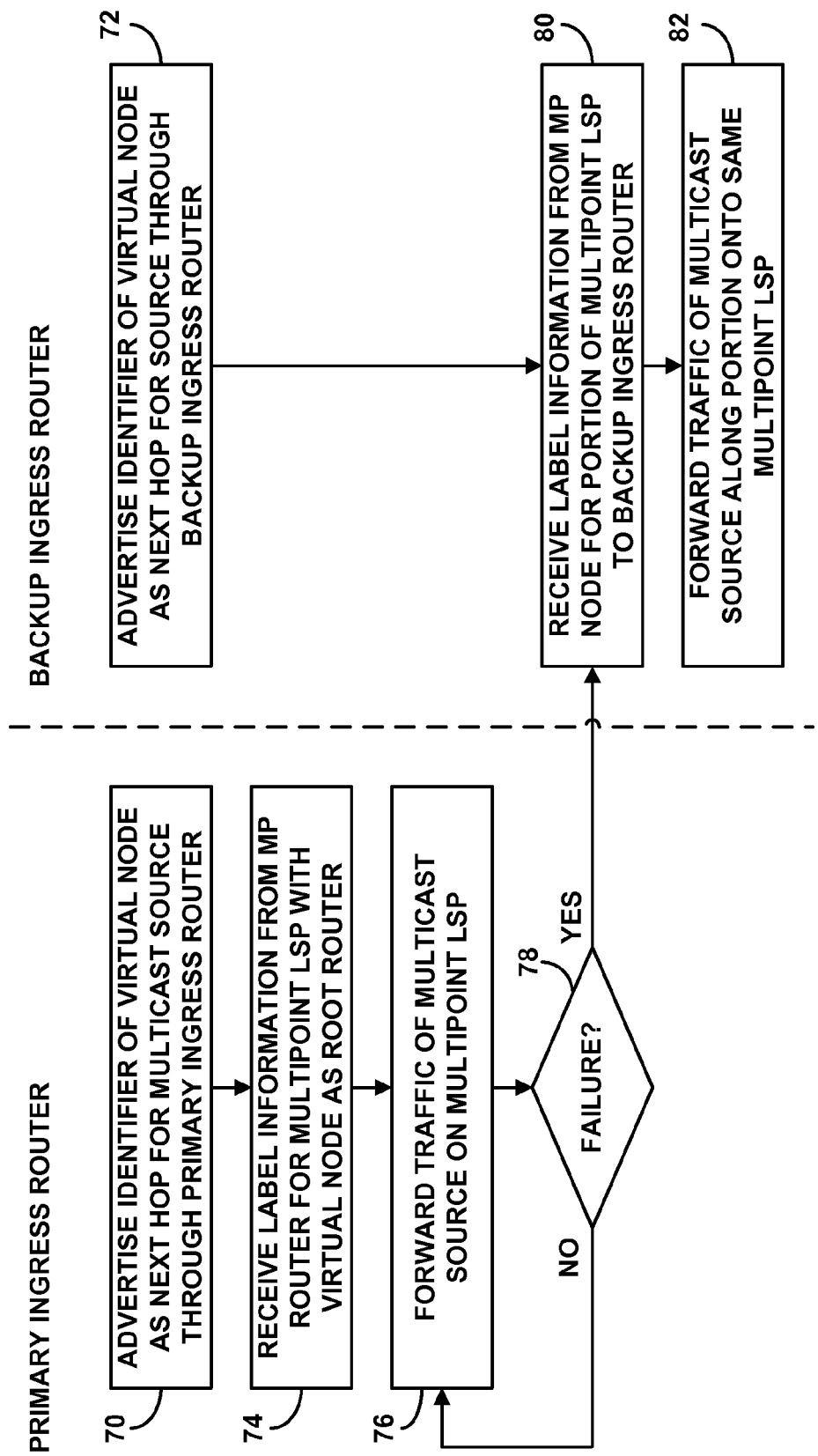
FIG. 4 is a flowchart illustrating an exemplary operation of providing ingress protection for a multipoint LSP with a virtual node as a root node.

FIG. 4 is a flowchart illustrating an exemplary operation of providing ingress protection for a multipoint LSP with a virtual node as a root node. The operation is described with respect to primary ingress router 32 and backup ingress router 34 for multipoint LSP 36 from FIG. 2.

Primary ingress router 32 advertises a virtual node identifier that identifies VN 30 as the next hop for multicast source 18 through primary ingress router 32 (70). Backup ingress router 34 also advertises the same virtual node identifier of VN 30 as the next hop for multicast source 18 through backup ingress router 34 (72). The virtual node identifier of VN 30 may comprise a globally unique IP address. Primary ingress router 32 and backup ingress router 34 may advertise the virtual node identifier of VN 30 as the next hop for multicast source 18 to egress routers 13 using BGP. In addition, primary ingress router 32 and backup ingress router 34 may advertise the virtual node identifier of VN 30 to MP router 14 and other intermediate routers 15 in network 10 as a virtual ingress node in the topology of network 10 using the IGP.

During establishment of multipoint LSP 36 with VN 30 as the root node, primary ingress router 32 receives label information for multipoint LSP 36 from MP router 14 (74). The label information for multipoint LSP 36 includes an address of MP router 14, the FEC of multipoint LSP 36, and a label for MP router 14. Once multipoint LSP 36 is established, primary ingress router 32 sends a PIM join request to multicast source 18 to receive the traffic of multicast source 18. Primary ingress router 32 then forwards traffic of multicast source 18 on multipoint LSP 36 to egress routers 13 (76).

When a failure occurs at primary ingress router 32 (YES branch of 78), MP router 14 detects the failure and establishes backup path 38 as a portion of multipoint LSP 36 during local repair to reach VN 30 through backup ingress router 34. During local repair, MP router 14 performs a route update based on an IGP trigger and determines a new shortest path to VN 30 as the root node. Based on the failure at primary ingress router 32, backup path 38 through backup ingress router 34 becomes the shortest path to reach VN 30 and MP router 14 selects backup ingress router 34 as the new upstream node.

During establishment of portion 38, backup ingress router 34 receives label information from MP router 14 for portion 38 of multipoint LSP 36 to backup ingress router 34 (80). Based on the failure at primary ingress router 32, the portion of multipoint LSP 36 between primary ingress router 32 and MP router 14 is torn down, and the portion 38 of multipoint LSP 36 between backup ingress router 34 and MP router 14 is established. Once portion 38 is established, backup ingress router 34 sends a PIM join request to multicast source 18 to receive the traffic of multicast source 18. Backup ingress router 34 then forwards traffic of multicast source 18 along portion 38 onto the same multipoint LSP 36 with VN 30 as the root node (82).

Figure 5:
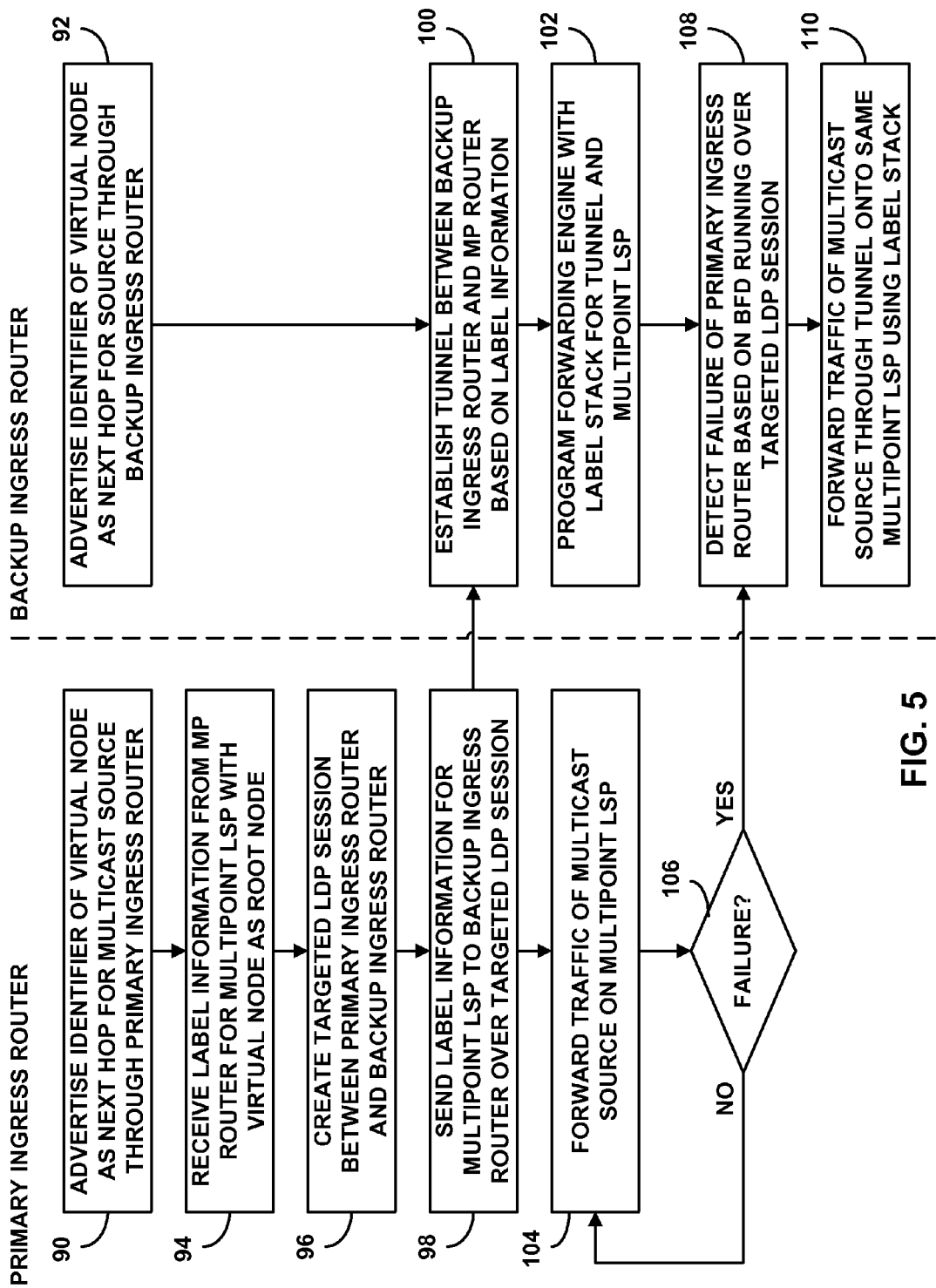
FIG. 5 is a flowchart illustrating another exemplary operation of providing ingress protection for a multipoint LSP with a virtual node as a root node using a pre-established tunnel.

FIG. 5 is a flowchart illustrating another exemplary operation of providing ingress protection for a multipoint LSP with a virtual node as a root node using a pre-established tunnel. The operation is described with respect to primary ingress router 32 and backup ingress router 34 for multipoint LSP 36 from FIG. 2.

Primary ingress router 32 advertises a virtual node identifier of VN 30 as the next hop for multicast source 18 through primary ingress router 32 (90). Backup ingress router 34 also advertises the same virtual node identifier of VN 30 as the next hop for multicast source 18 through backup ingress router 34 (92). The virtual node identifier of VN 30 may comprise a globally unique IP address. Primary ingress router 32 and backup ingress router 34 may advertise the virtual node identifier of VN 30 as the next hop for multicast source 18 to egress routers 13 using BGP. In addition, primary ingress router 32 and backup ingress router 34 may advertise the virtual node identifier of VN 30 to MP router 14 and other intermediate routers 15 in network 10 as a virtual ingress node in the topology of network 10 using the IGP.

During establishment of multipoint LSP 36 with VN 30 as the root node, primary ingress router 32 receives label information for multipoint LSP 36 from MP router 14 (94). The label information for multipoint LSP 36 includes an address of MP router 14, the FEC of multipoint LSP 36, and a label for MP router 14. Primary ingress router 32 also creates a targeted LDP session between primary ingress router 32 and backup ingress router 34 (96). Primary ingress router 32 may run bidirectional forwarding detection (BFD) over the targeted LDP session. Primary ingress router 32 then sends the label information for multipoint LSP 36 to backup ingress router 32 over the targeted LDP session (98). Primary ingress router 32 sends the label information to backup ingress router 34 because during establishment of multipoint LSP 36, MP router 14 only sends the label information to primary ingress router 32 along the shortest upstream path.

At the same time that multipoint LSP 36 is established, backup ingress router 34 establishes backup path 38 as a tunnel between backup ingress router 34 and MP router 14 based on the label information received from primary ingress router 32 (100). In some cases, backup ingress router 34 establishes tunnel 38 using RSVP. Tunnel 38 provides an alternative path for MP router 14 along multipoint LSP 36 to reach VN 30 through backup ingress router 36. Backup ingress router 34 then programs its forwarding engine with a label stack for traffic of multicast source 18 that includes a top label for tunnel 38 and a bottom label for multipoint LSP 36 (102).

Once multipoint LSP 36 and tunnel 38 are established, primary ingress router 32 and backup ingress router 36 may each send a PIM join request to multicast source 18 to receive the traffic of multicast source 18. In this case, both primary ingress router 32 and backup ingress router 34 receive the traffic of multicast source 18. Primary ingress router 32 then forwards the traffic of multicast source 18 on multipoint LSP 36 to egress routers 13 (104). Backup ingress router 34 drops the traffic of multicast source 18.

When a failure occurs at primary ingress router 32 (YES branch of 106), backup ingress router 34 detects the failure based on BFD running over the targeted LDP session (108). Based on the failure at primary ingress router 32, multipoint LSP 36 is torn down between primary ingress router 32 and MP router 14. Backup ingress router 34 then begins forwarding the traffic of multicast source 18 through tunnel 38 onto the same multipoint LSP 36 with VN 30 as the root node using the label stack (108).

Various examples of the techniques of the disclosure have been described. These and other examples are within the scope of the following claims.

The invention claimed is:

1. A method comprising:
   advertising, with a primary ingress node of a network connected to a multicast source, a virtual node identifier that identifies a virtual node as a next hop for the multicast source through the primary ingress node;
   advertising, with a backup ingress node of the network connected to the same multicast source, the same virtual node identifier that identifies the same virtual node as the next hop for the multicast source through the backup ingress node;
   forwarding, with the primary ingress node, traffic of the multicast source on a multipoint label switched path (LSP) established between the virtual node as a root node and two or more egress nodes of the network; and
   based on a failure at the primary ingress node, forwarding, with the backup ingress node, the traffic of the multicast source through a backup path onto the same multipoint LSP with the virtual node as the root node.

2. The method of claim 1, wherein advertising the virtual node identifier comprises advertising the virtual node identifier using a border gateway protocol (BGP) between the primary and backup ingress nodes and the egress nodes.

3. The method of claim 1, further comprising advertising the virtual node identifier of the virtual node as a virtual ingress node in a topology of the network using an interior gateway protocol (IGP) between the primary and backup ingress nodes and intermediate nodes included in the network.

4. The method of claim 1, wherein the virtual node identifier comprises a globally unique Internet Protocol (IP) address.

5. The method of claim 1, further comprising, based on the failure at the primary ingress node, receiving, with the backup ingress node, label information for the backup path from a merge point (MP) node along the multipoint LSP, wherein the backup path is established between the backup ingress node and the MP node as a portion of the multipoint LSP during local repair to reach the virtual node through the backup ingress node.

6. The method of claim 5, wherein, based on the failure at the primary ingress node, a portion of the multipoint LSP is torn down between the primary ingress node and the MP node.

7. The method of claim 1, further comprising detecting, with the backup ingress node, the failure at the primary ingress node.

8. The method of claim 7, further comprising creating a targeted label distribution protocol (LDP) session between the primary ingress node and the backup ingress node, and running bidirectional forwarding detection (BFD) over the targeted LDP session to detect the failure at the primary ingress node with the backup ingress node.

9. The method of claim 1, further comprising, prior to the failure at the primary ingress node, establishing the backup path as a tunnel between the backup ingress node and a merge point (MP) node along the multipoint LSP to reach the virtual node through the backup ingress node.

10. The method of claim 9, further comprising programming a forwarding engine of the backup ingress node with a label stack for the traffic of the multicast source, wherein the label stack includes a top label for the tunnel and a bottom label for the multipoint LSP.

11. The method of claim 9, further comprising sending, with the primary ingress node, label information for the multipoint LSP to the backup ingress node, wherein the label information includes a MP node address, a forwarding equivalence class (FEC) of the multipoint LSP, and a MP node label for the multipoint LSP.

12. The method of claim 11, further comprising creating a targeted label distribution protocol (LDP) session between the primary ingress node and the backup ingress node, and sending the label information for the multipoint LSP over the targeted LDP session to the backup ingress node.

13. The method of claim 11, wherein establishing the tunnel comprises establishing the tunnel between the backup ingress node and the MP node using a resource reservation protocol (RSVP) based on the label information received from the primary ingress node.

14. The method of claim 1, wherein the failure at the primary ingress node comprises one of a failure of the primary ingress node or a failure of the connection between the primary ingress node and the multicast source.

15. A network system comprising:
a primary ingress node of a network connected to a multicast source, wherein the primary ingress node is configured to advertise a virtual node identifier that identifies a virtual node as a next hop for the multicast source through the primary ingress node, and forward traffic of the multicast source on a multipoint label switched path (LSP) established between the virtual node as a root node and two or more egress nodes of the network; and
a backup ingress node of the network connected to the same multicast source, wherein the backup ingress node is configured to advertise the same virtual node identifier that identifies the same virtual node as the next hop for the multicast source through the backup ingress node, and, based on a failure at the primary ingress node, forward the traffic of the multicast source through a backup path onto the same multipoint LSP with the virtual node as the root node.

16. The system of claim 15, wherein the primary and backup ingress nodes are each configured to advertise the virtual node identifier to the egress nodes using a border gateway protocol (BGP).

17. The system of claim 15, wherein the primary and backup ingress nodes are each configured to advertise the virtual node identifier of the virtual node as a virtual ingress node in a topology of the network to intermediate nodes included in the network using an interior gateway protocol (IGP).

18. The system of claim 15, wherein the virtual node identifier comprises a globally unique Internet Protocol (IP) address.

19. The system of claim 15, wherein, based on the failure at the primary ingress node, the backup ingress node is configured to receiving label information for the backup path from a merge point (MP) node along the multipoint LSP, wherein the backup path is established between the backup ingress node and the MP node as a portion of the multipoint LSP during local repair to reach the virtual node through the backup ingress node.

20. The system of claim 19, wherein, based on the failure at the primary ingress node, a portion of the multipoint LSP is torn down between the primary ingress node and the MP node.

21. The system of claim 15, wherein the backup ingress node is configured to detect the failure at the primary ingress node.

22. The system of claim 21,
wherein the primary ingress node is configured to create a targeted label distribution protocol (LDP) session between the primary ingress node and the backup ingress node, and run bidirectional forwarding detection (BFD) over the targeted LDP session, and
wherein the backup ingress node is configured to detect the failure at the primary ingress node based on the BFD.

23. The system of claim 15, wherein, prior to the failure at the primary ingress node, the backup ingress node establishes the backup path as a tunnel between the backup ingress node and a merge point (MP) node along the multipoint LSP to reach the virtual node through the backup ingress node.

24. The system of claim 23, wherein the backup ingress node is configured to program its forwarding engine with a label stack for the traffic of the multicast source, wherein the label stack includes a top label for the tunnel and a bottom label for the multipoint LSP.

25. The system of claim 23, wherein the primary ingress node is configured to send label information for the multipoint LSP to the backup ingress node, wherein the information includes a MP node address, a forwarding equivalence class (FEC) of the multipoint LSP, and a MP node label for the multipoint LSP.

26. The system of claim 25, wherein the primary ingress node is configured to create a targeted label distribution protocol (LDP) session between the primary ingress node and the backup ingress node, and send the label information for the multipoint LSP over the targeted LDP session to the backup ingress node.

27. The system of claim 25, wherein the backup ingress node is configured to establish the tunnel between the backup ingress node and the MP node using a resource reservation protocol (RSVP) based on the label information received from the primary ingress node.

28. The system of claim 15, wherein the failure at the primary ingress node comprises one of a failure of the primary ingress node or a failure of the connection between the primary ingress node and the multicast source.

29. A non-transitory computer-readable storage medium comprising program instructions for causing one or more programmable processors to:

advertise, with a primary ingress node of a network connected to a multicast source, a virtual node identifier that identifies a virtual node as a next hop for the multicast source through the primary ingress node;

advertise, with a backup ingress node of the network connected to the same multicast source, the same virtual node identifier that identifies the same virtual node as the next hop for the multicast source through the backup ingress node;

forward, with the primary ingress node, traffic of the multicast source on a multipoint label switched path (LSP) established between the virtual node as a root node and two or more egress nodes of the network; and based on a failure at the primary ingress node, forward, with the backup ingress node, the traffic of the multicast source through a tunnel onto the same multipoint LSP with the virtual node as the root node.

* * * * *